W. McCONNELL.
VEHICLE FENDER.
APPLICATION FILED JUNE 2, 1917.
1,249,149. Patented Dec. 4, 1917.
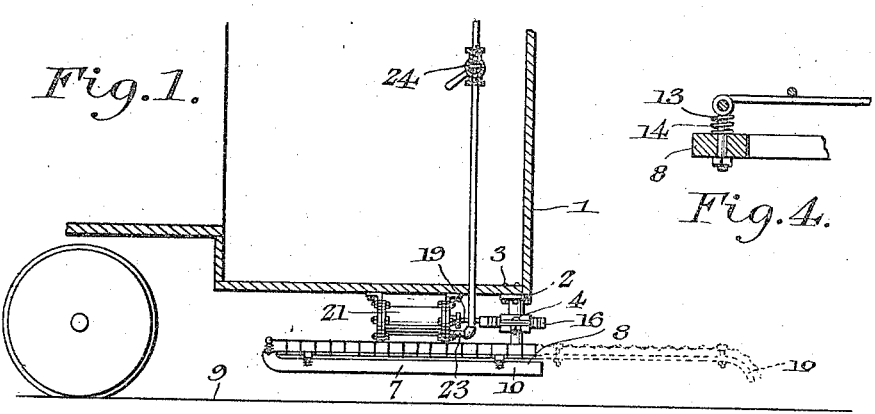
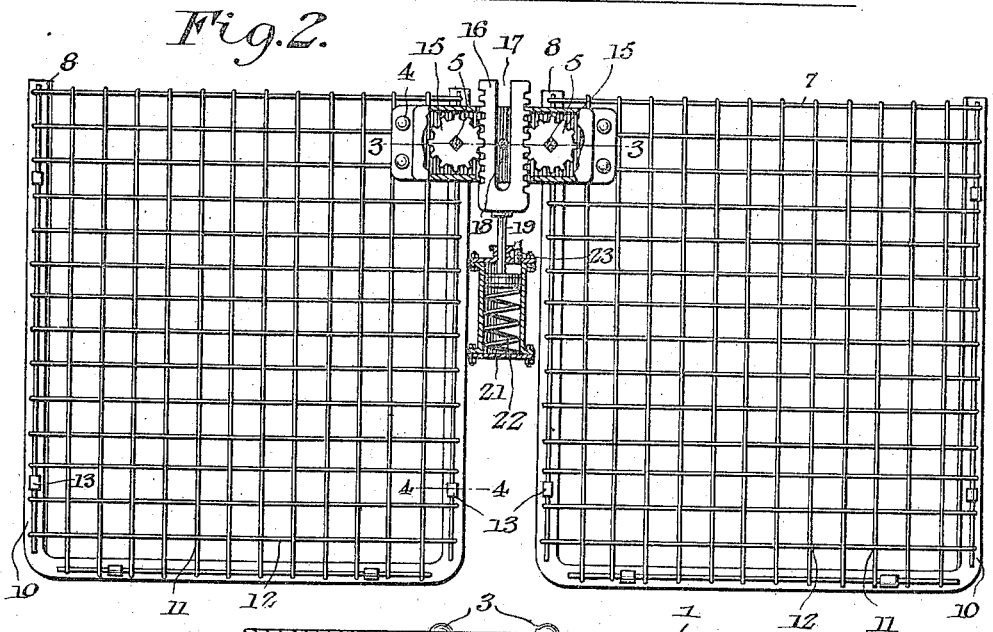
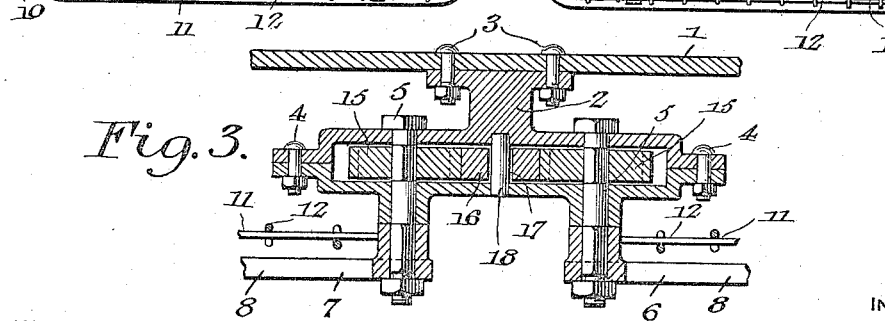
WITNESS
Frederick W. Ely
INVENTOR
William McConnell.
BY Victor J. Evans
ATTORNEY

UNITED STATES PATENT OFFICE.

WILLIAM McCONNELL, OF PHILADELPHIA, PENNSYLVANIA.

VEHICLE-FENDER.

1,249,149.  Specification of Letters Patent.  Patented Dec. 4, 1917.

Application filed June 2, 1917. Serial No. 172,473.

*To all whom it may concern:*

Be it known that WILLIAM MCCONNELL, a subject of the British Empire, residing at 1224 N. Taylor st., Philadelphia, in the county of Philadelphia and State of Pennsylvania, have invented new and useful Improvements in Vehicle-Fenders, of which the following is a specification.

This invention relates to improvements in fenders, and more particularly to an improved fender designed for use in connection with street cars and other similar vehicles, which will prevent the wheels of the vehicle from passing over a person or object.

Another object of the invention is to provide a fender of simple, compact and inconspicuous construction, which may be readily placed upon a vehicle and may be quickly operated to assume an extended position in order to prevent the vehicle from seriously injuring persons or other objects that it may strike, and also to minimize the danger of injury to the vehicle in the event of a collision.

A further object of the invention resides in the provision of a fender consisting of a plurality of swinging frames, preferably mounted beneath the body of the car, the frames being adapted to be folded beneath the car when not in use, and to have rack and pinion mechanism associated therewith which is operated by means of fluid-actuated mechanism, so that the frames may be swung to an active position in advance of the car so as to assume guarding positions.

With the above and other objects in view, the invention consists in the novel features of construction, and the combination and arrangement of parts hereinafter more fully described, pointed out in the claims, and shown in the accompanying drawing, in which—

Figure 1 is a fragmentary view of a street car illustrating the application of the fender comprising the preferred form of the present invention hereto.

Fig. 2 is a bottom plan view of the fender.

Fig. 3 is a transverse sectional view taken along the line 3—3 of Fig 2. and

Fig. 4 is a vertical sectional view taken along the line 4—4 of Fig. 2.

Referring more particularly to the drawing, 1 indicates the front of a street car, to the under surface of which is secured a bracket 2, the latter being preferably secured to the car by means of bolts 3. The bracket is formed to provide upper and lower sections, which are secured together by means of fastening elements 4, and carried by said bracket are spaced vertically extending shafts 5, the latter being free to rotate within said bracket.

Fixed in any suitable manner to the lower extremities of the shafts 5 are swinging frame members 6 and 7 of the fender, said members including U-shaped bars 8 of metal, which normally lie beneath the platform of the car 1, and are positioned a suitable distance above the trackway 9 of said car. The normally forward extremities 10 of the bars are usually curved downwardly, so as to prevent an object struck by the same from falling upon the trackway 9. The frames are preferably provided with yieldable surfaces 11, consisting in this instance of intertwined wires 12, the outer of which being provided with bolts 13 or the like, which extend through openings provided in the bar 8. Springs 14 are interposed between the surfaces 11 and the bars, so as to retain the surfaces 11 in a normally elevated position, in order to cushion the fall of an object or person thereon.

When the fender is not in use the same is adapted to be folded underneath the car 1, and means have been provided in conjunction therewith for revolving said frames from positions beneath the car to extended object-engaging positions, in an expeditious and convenient manner. To this end the shafts 5 have their upper extremities provided with fixed pinions 15, the latter lying within the bracket 2. Meshing with the pinions 15 is a sliding rack bar 16, which is preferably formed with a longitudinally extending slot 17. A pin or the like 18 passes through the slot, and is carried by the bracket 2, to guide and limit the movement of the rack bar. Connected with the inner extremity of said bar is a piston rod 19, which is connected with a reciprocating piston 20, carried by a cylinder 21, the latter being preferably secured in any suitable manner to the platform of the car 1. A spring 22 is mounted within said cylinder and surrounds the rod 19, said spring being interposed between one of the end walls thereof and the piston 20, so as to retain the latter in a retreated position within the cylinder. Thus by reason of the rod 19 and its associated rack and pinion mechanism, the spring 22 will serve to automatically retain the frame members 6 and 7 of the fender in their normally retracted positions beneath the car 1.

However, in order to extend the frames to a position in advance of the car when a danger condition confronts the latter, the cylinder 21 is provided with an air-inlet pipe 23, which extends from a suitable source of air supply (not shown). A manually operated valve 24 is carried by the pipe 23, and normally serves to prevent air from entering the cylinder 21. By manipulating the valve 24, however, air will be admitted into the cylinder 21 under pressure, so as to force the piston 20 in a forward direction against the normal tension or influence of the spring 22. This results in actuation of the pinion and rack bar mechanism, and in the synchronous rotation of the shafts 5 and their coöperating frames 6 and 7, causing the latter elements to revolve approximately 90 degrees, so as to lie in front of the car 1. The frames may be retracted by causing the valve 24 to be actuated to assume a normal position, which permits air within the cylinder 21 to be exhausted therethrough, thereby permitting the spring 22 to act upon the piston 20 so as to retract said frame members. When the frame members are extended, the inner or contiguous edges thereof are slightly spaced, so as to prevent an object from being caught or crushed therebetween, this feature, however, is subject to modification.

From the foregoing description it is thought that the construction and operation of the invention will be apparent, the following remarks being inserted as a summary. When the operator of the car 1 notices a danger condition confronting the car, he immediately operates the valve 24, so that compressed air will flow into the cylinder 21. This operation results in forcing back the piston 20 against the tension of the spring 22, and synchronously effects the reciprocation of the rack bar 16. The movement of the rack bar is imparted to the pinions 15 so as to turn the shafts 5, which shafts being connected with the frame members 6 and 7 will result in the oscillation of said members, to cause the same to assume an advanced position. If the fender strikes a person, the latter will be caught by the curved forward extremities 10 of the bars 8 and will be thrown upon the yieldable surfaces 11, in a practically unharmed condition. In order that the fender may be out of the way under normal conditions, the valve 24 when in a normal position will permit compressed air contained by the cylinder 21 to escape thus permitting the spring 22 to actuate the rack bar 16, so as to revolve said frame members to their retracted positions beneath the car 1.

Thus it will be evident that there is provided mechanism whereby all of the objects of the present invention have been achieved, and that the advantageous features above mentioned are, among others, present. The fender is relatively simple in construction, can be expeditiously and conveniently operated and will not protrude in front of the car when the latter is operating under normal conditions.

Various slight changes might be made in the general form and arrangement of parts described, without departing from the invention, and hence I do not limit myself to the precise details set forth, but consider myself at liberty to make such changes and alterations as fairly fall within the spirit and scope of the present claims.

Having described the invention what is claimed as new and patentable is;

1. A vehicle fender embodying a plurality of swinging frames, a bracket supported upon a coöperating vehicle, shafts connected with said frames for effecting the movement thereof and journaled in said bracket, a slidable rack carried by said bracket, pinions mounted upon the upper ends of said shafts and meshing with the teeth of said rack, and fluid-actuated means connected with said rack, whereby when said means are thrown into active operation said frames will be oscillated to assume extended positions.

2. A vehicle fender embodying a plurality of swinging frames, shafts connected with said frames for effecting the movement thereof, pinions carried by said shafts and journaled in a bracket depending from a coöperating vehicle, a slidable rack carried by said bracket, pinions mounted upon the upper ends of said shafts and meshing with the teeth of said rack, fluid-actuated means connected with said rack, whereby when said means are thrown into active operation said frames will be oscillated to assume extended positions, and resilient mechanism operable in conjunction with said means to automatically return said frames to withdrawn positions beneath said vehicle when said means are in a normal condition.

3. A vehicle fender embodying a swinging frame, a bracket depending from a coöperating vehicle for supporting said frame, rack and pinion mechanism carried by said bracket, and valve-controlled, fluid-actuated means connected with said rack to oscillate said frame from a position beneath said vehicle to an extended position in advance of the same.

4. A vehicle fender embodying a swinging frame, a bracket depending from a coöperating vehicle for supporting said frame, rack and pinion mechanism carried by said bracket, and valve-controlled, fluid-actuated means connected with said rack to oscillate said frame from a position beneath said vehicle to an extended position in advance of the same, and retractive mechanism for automatically returning said frame from said extended position to a withdrawn position.

In testimony whereof I affix my signature.

WILLIAM McCONNELL.

Copies of this patent may be obtained for five cents each, by addressing the "Commissioner of Patents, Washington, D. C."